Feb. 19, 1952 K. R. WENDT 2,586,193

KEYED AUTOMATIC GAIN CONTROL SYSTEM

Filed Aug. 19, 1948

Inventor

KARL R. WENDT

By

[signature]

Attorney

Patented Feb. 19, 1952 2,586,193

UNITED STATES PATENT OFFICE 2,586,193

KEYED AUTOMATIC GAIN CONTROL SYSTEM

Karl R. Wendt, Hightstown, N. J., assignor to Radio Corporation of America, a corporation of Delaware Application August 19, 1948, Serial No. 45,177

1 Claim. (Cl. 178—7.5)

This invention relates to automatic gain control systems for use in radio receivers adapted to receive image type signals having synchronizing and black level (blanking) information included therein, and more particularly for use in present day television receiver systems.

The present invention deals more particularly with a novel form of keyed automatic gain control for television receivers and operates to control the degree of amplification of the video signals afforded by the television receiver in accordance with the intensity of the radio carrier received during the synchronizing or blanking intervals.

There is provided, through the use of the present invention, a novel automatic gain control arrangement substantially free from the effects of noise even when the receiver is operated in areas where the noise level is extremely high. By incorporating the present invention in typical receiver circuits, operation of the receiver can be satisfactorily obtained without loss of video signal strength to the image viewing tube and without the possibility of the receiver circuit being biased beyond cut-off (or blocked) as a result of strong surges of automatic gain control potential as may be experienced in the operation of certain other circuits providing automatic gain control action.

It is commonly known that automatic gain control circuits for use in television receiving equipment differ greatly from the more frequently encountered automatic gain control circuit embodied in receivers for sound broadcast signals. In the instance of the usual broadcast receiver designed for the reception of amplitude modulated carriers, it is deemed adequate that the automatic gain control potential be produced by electrical information gleaned from the average carrier intensity of the received radio signal. Clearly, such an automatic gain control circuit would not be satisfactory for controlling the gain of television receiver video channels as the average signal strength of the radio frequency carrier is a function of the average image or picture brilliance sometimes referred to as "background level." As pointed out in the aforementioned applications by Karl R. Wendt, development of an automatic gain control voltage in accordance with the average signal strength of the received radio carrier would cause the gain to be changed not only in accordance with the signal intensity variations of the received radio carrier due to undesirable fading or other atmospherical phenomena, but also in accordance with average picture brilliance of the image being transmitted.

Radio transmitted "negative modulated" television signals normally include blanking pulses or black level information, which data is transmitted between each image line in combination with the line synchronizing pulse. This line sync pulse is most commonly superimposed upon the black level signal and these data are transmitted at some respectively predetermined constant but different carrier levels. In common television practice the sync pulse is transmitted at maximum carrier intensity, or 100 percent carrier amplitude, while the black level or blanking pulse is transmitted at approximately 75 percent of the full carrier amplitude. The blanking impulse or black level signal in accordance with R. M. A. television synchronizing waveform standards is of the order of 16 to 18 percent of a line interval with the sync impulse having a period of approximately 8 percent of a line interval. Sync impulses when superimposed upon the blanking or black level signals are stationed between the extremities of the blanking interval so as to form what is commonly termed a "front porch" and a "back porch" on the pedestal-like structure formed by the combined sync signal and blanking impulse. The front porch interval is approximately 2 percent of the line interval and represents the time between the leading edge of each black level signal and the leading edge of the line sync pulse, whereas the back porch interval of approximately 8 percent of a line interval is equivalent to the time interval between the end of the line sync pulse and the termination of the black level or blank out signal.

The amplitude of the radio frequency carrier as previously brought out is held constant during the transmission of all blanking and sync impulse information. During the transmission of image intelligence of the television signal, that is, during each line interval between successive blanking signals, the average amplitude of the transmitted radio frequency carrier is a function of the average light contained in the television image. Accordingly, if the reproduced image is to be predominantly dark, the average carrier amplitude will necessarily be greater than would be the case if the background level of the image were considerably lighter, such action of course being true only in the negative system of transmission wherein white picture information is transmitted at a lower carrier level than black level information. It is expedient, in order that the control of the gain of the receiver be in accordance with the proper aspects of the carrier, that the automatic gain control potential be developed such that its magnitude is a function of the intensity of the received carrier of the television signal during the blanking or sync intervals only, and as hereinbefore brought out, not during the transmission of the picture or line information.

Since, the blanking and more particularly the sync signals are transmitted at greater radio frequency intensity than image line information, it has been the general practice in television receivers to utilize some form of a peak rectifier which responds to those peak pulses of energy represented by the blanking and synchronizing signals during the synchronizing intervals. An automatic gain control system of this type is satisfactory to a degree so long as extraneous signals are not received in sufficient intensity to cause the peak rectifier to respond to this undesirable signal energy. In such arrangement if there is considerable noise picked up at the receiver the noise signal, as such, especially if it has an amplitude in excess of the received carrier during the synchronizing intervals, will cause the peak detector to produce an abnormal increase in rectifier energy and therefore produce abnormal increase in automatic gain contral potential which results in a generally undesirable reduction of the receiver sensitivity as a result of such noise. This of course interferes with the proper operation of the receiver and produces fluctuations of the reproduced image brightness with possible periods following the noise bursts during which inadequate synchronizing information is applied to the synchronizing circuits due to an abnormally high reduction in receiver gain. This latter effect, to be later discussed, tends to produce "tearing out" or other destructive "disturbances" in the reproduced image. Furthermore, in such systems the automatic gain control potential that is developed by each successive sync or blanking signal is generally stored on a condenser or applied to a circuit having a time constant where delay action obtains such that the automatic gain control potential can for all practical purposes be maintained constant throughout one or more succeeding field intervals. Due to the operation of the peak detector and the presence of this time delay circuit such a circuit responds rapidly to high intensity noise pulses but does not allow the receiver to recover as quickly from the effects of noise as it responds to the noise, with the result that proper gain of the video channel is not re-established until after an interval corresponding to many image lines has elapsed.

In the presence of considerable noise such automatic gain control circuits are not therefore entirely satisfactory since they respond to noise pulses as well as sync impulses and in so doing are slow to recover from sporadic increased energy effects represented by the additional noise.

The present invention serves to overcome the above related disadvantages by means of a simple arrangement employing a triode vacuum tube connected as a form of amplitude gate which is placed under the influence of keying pulses and permits development of automatic gain control potential only during time periods corresponding to blanking intervals of the video signal. Thus the automatic gain control circuit, while responsive to signal strength variations of the radio carrier during a part of these intervals, does not in any way respond to noise pulse that may occur between the transmission of said blanking intervals. This keyed action preferably is timed to occur during the back porch portion of the blanking signal such that an AGC voltage will be developed on a base divorced from actual synchronizing information and therefore not influenced by variations thereof. This feature alone is of considerable value since the interval during which the automatic gain control circuit is effected to respond to the received signal strength is only of the order of 5 percent of the line period time so that during 95 percent of the time during which the receiver is operated the automatic gain control circuit is wholly unresponsive to any received signals.

Accordingly, the present invention, due to the above described keying action, will display, ideally, 20 times the noise immunity possible in unkeyed gain control circuits. This increase of 20 times the noise immunity, however, may not be fully realized in practical applications due to several minor factors which will become apparent as the specification proceeds.

The present invention, in addition to providing absolute noise immunity during 95 percent of the line interval, is also in part immune to noise which may occur during the approximate 5 percent of time during which the automatic gain controlling circuit is keyed into response to the received signal. This follows since in the present system, if a noise impulse should be received during the 5 percent interval, the circuit is so arranged as to be relatively immune to rapid increases in signal intensity such as where short noise bursts are superimposed on the blanking signal, but is quick to response to the return of signal conditions to normal or to noise effects corresponding to reductions in signal strength. Since "white noise" (that is, noise tending to reduce the average carrier level during the blanking period), is rarely encountered due to the complexity of the requisite noise-signal conditions, this action, which is the reverse of commonly encountered AGC systems, does add favorably to its performance. Apparatus embodying the present invention may also incorporate a protection against control grid blocking of the receiver as a result of rapid rises in signal strength, in that a limit may be easily automatically established as to the maximum AGC voltage produceable by the circuit.

It is a purpose of the present invention to provide an improved automatic gain control circuit, simple in operation for embodiment in radio receivers adapted to translate standard types of television signals wherein the circuit is rendered immune to noise for approximately 95 percent of the transmitted signal duration.

It is another purpose of the present invention to provide a new and improved automatic gain control circuit in which the reference base for the development of automatic gain control potential is that of the television signal carrier strength exhibited during transmission of the black level signal.

Another purpose of the present invention resides in the provision of an improved automatic gain control circuit for a television receiver, wherein the circuit is rendered unresponsive to received signals during the intervals between successive blanking periods.

Another object of the present invention resides in the provision of a novel automatic gain control circuit for a television receiver wherein potentials of the order adequate to block translation of video signals through said receiver are prevented from development as a result of automatic gain control action.

It is another purpose of the present invention to provide a simple and economical system for automatic gain control operation which requires a minimum of apparatus and yet achieves all of the previous objects set forth hereinabove.

Still another object of the present invention resides in the provision of a novel automatic gain control circuit employing a triode vacuum tube, said circuit being suitable for incorporation in standard television receiving circuits to provide generation of an automatic gain control potential whose alternation in potential due to increase in signal strength is markedly slow whereas changes in the produced control voltage due to a decrease in received carrier is markedly fast.

The novel features which are believed to be characteristic of the present invention are set forth in the appended claims, the invention itself, however, as to both its organization and method of operation will be best understood through the teaching of the following description especially when taken in connection with the accompanying drawings wherein:

In the drawings like elements are assigned like reference characters.

Figures 1, 2, 3:
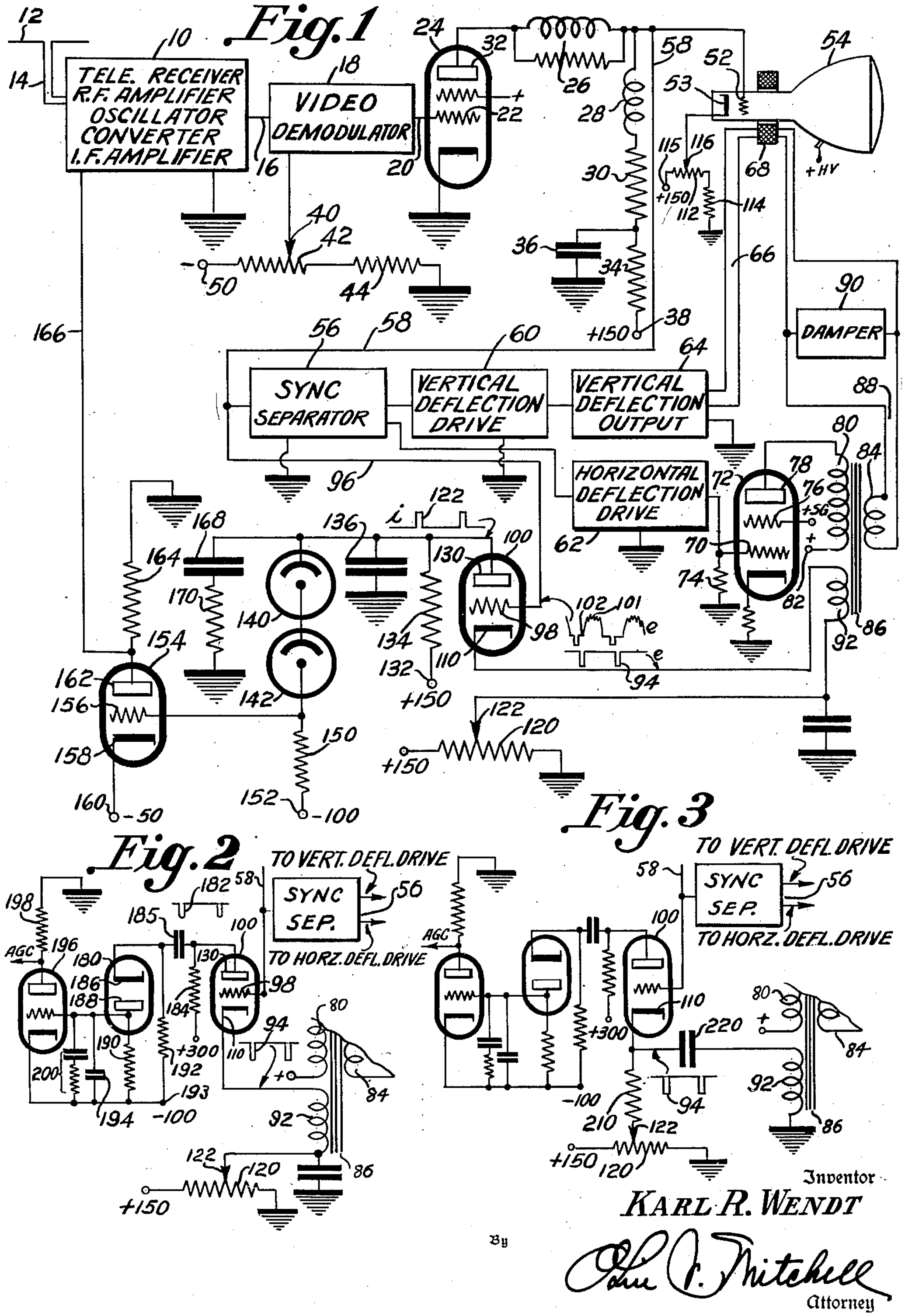
Figure 1 is one embodiment of the present invention as applied to a conventional television receiving circuit.
Figure 2 shows another form of practicing the present invention.
Figure 3 shows still another embodiment of the present invention as practiced in connection with a conventional television receiver.

Referring now to Figure 1, there is indicated in block 10 certain components of a conventional television receiver including the R. F. amplifier, the oscillator, the first detector or converter and the intermediate frequency amplifier. The signals are picked up by antenna 12 and through the medium of transmission line 14 are applied to the input of the receiver, as shown. The output of the intermediate frequency amplifier included in block 10 is suitably connected through path 16 to the video demodulator 18 which demodulates the video intermediate frequency carrier to produce the image signals including blanking and sync information and subsequently applies the same, via a direct current coupling path 20, to grid 22 of vacuum tube 24. The vacuum tube 24 is connected for operation as a video frequency amplifier being typically provided with frequency compensation by means of elements 26, 28, and 30 connected in series with the polarizing potential for the anode 32. Also connected in series with the polarizing potential path for the anode, is decoupling resistor 34 which acts in conjunction with by-pass condenser 36 to isolate video amplifier plate current changes from the +150 volt polarizing potential terminal 38.

Establishment of the plate current characteristic region over which the video amplifier tube 24 is to operate is accomplished through adjustment of the tap 40 on potentiometer 42, the potentiometer being connected in series with resistor 44 as a bleeder to ground across a bias supply potential made available at terminal 50. As will be seen later, this potentiometer in combination with the action of the overall AGC system provides a suitable picture "contrast" control which does not affect the picture "black level" but only offers control over the picture "white level." The video signal including synchronizing information applied to the grid 52 of the kinescope 54 is also applied to the input of the sync separator 56 via circuit path 58. In accordance with conventional television receiver design the output of the sync signal separator 56 is connected with the vertical and horizontal deflection driving generators 60 and 62 respectively. The function of these deflection drive generators is to supply a suitable form of sawtooth voltage for conventional deflection of the electron beam in the kinescope 54. The output of the vertical deflection drive generator 60 is then applied to the vertical deflection output stage 64 which is connected by line 66 to the vertical deflection winding of a deflection yoke 68. Whereas the components of the deflection output stage 64 are conventional in nature and hence clearly representable in block diagram form, the horizontal deflection output stage connected for excitation of the horizontal deflection yoke 68 is to also serve, as hereinafter described, in the capacity of a control for the subject AGC system.

Accordingly the output of the horizontal deflection drive generator 62 is applied to the grid 70 of vacuum tube 72, suitable grid return impedance being illustrated by resistor 74 connected with ground potential. The screen grid 76 is connected with a positive source of potential indicated by +s. g., while polarizing potential for the anode 78 is supplied through deflection output transformer primary winding 80, from a source of positive potential having a terminal indicated at 82. In a conventional manner the deflection signal for the deflection yoke 68 is supplied from the secondary winding 84 of the output transformer 86 through line 88, across which is connected a suitable damping circuit 90 to improve circuit efficiency. A circuit arrangement (not shown) may also be associated with the output transformer 86 for producing high voltage for the kinescope or image tube. Associated with the horizontal output deflection circuit is an auxiliary winding 92 which operates to supply a series of pulses 94 derived from the horizontal deflection circuit operation.

It is to be noticed that the video signal at the output of the video amplifier 24 applied to the synchronizing separator 56 is through the same circuit path 58, in conjunction with circuit path 96, applied to the grid 98 of AGC triode 100. The form of the video signal-voltage here applied is illustrated by the curve 101 shown in relative time relationship with the production of keying pulses from the horizontal output transformer auxiliary secondary winding 92. Accordingly, it is seen that the keying pulses 94, applied to the cathode 110 of the vacuum tube 100, are not only in a direction to drive the cathode negatively during their generation, but are timed, relative to the received video signal 100, to occur during the back porch interval 102 of the blanking and synchronizing signal pedestal component. Since the D. C. potential applied to the grid 52 of the kinescope 54 is positive with respect to ground by an amount equal to the difference between +150 volts and the voltage drop across the elements 28, 30, and 34, the cathode 53 of the kinescope 54 and the cathode 110 of tube 100 must be placed at a positive potential in excess of their associated grid potentials. This is to provide negative control grid bias. In the case of the kinescope 54, a conventional form of brightness control is shown comprising potentiometer 112 connected in series with bleeder resistor 114 and a positive potential source 115 of +150 volts. Therefore by adjustment of the tap 116 of potentiometer 112, the negative bias on the grid 52 of the kinescope 54 may be varied to control the brightness or intensity of the beam within.

In the case of the AGC vacuum tube 100 the cathode 110 is returned to a positive potential considerably in excess of that existing on the grid 98 by simply returning the lower end of the auxiliary secondary winding 92 to potentiometer 120 connected across +150 volts to ground. Positioning of the tap 122 on the potentiometer 120 will allow a net negative bias to be applied to the grid 98 of the AGC triode and in normal operation of the present invention this level is established so as to produce plate current cut-off in the vacuum tube 100 during the absence of keying pulses 94.

Under such bias cut-off conditions, if the keying pulses 94 (poled to drive the cathode 110 negatively) are of sufficient amplitude, they will overcome the negative cut-off bias on the tube 100 and establish plate current conduction during the intervals of their production. Correspondingly then, with the arrangement shown wherein the keying pulses 94 occur once during each blanking interval and phased with the back porch portion thereof, the tube 100 will be rendered conductive during this period. Inasmuch as the blank out signal 102 extends in a negative direction on the grid 98, the net plate current pulse (shown at 122) in vacuum tube 100 due to the combined signals 94 and 101, will be of an amplitude inversely proportional to the blanking level 102 during keyed operation of the tube 100. As the pulses 94 are of constant amplitude, a reduction in received signal strength attended by a decrease in the amplitude of the video signal 101, will permit the pulse 94 to drive the tube 100 into a heavier state of conduction and hence produce greater amplitude plate current pulses 122; conversely an increase in signal strength during the keyed conduction of vacuum tube 100 will reduce the amplitude of the plate current pulse 122. In view of this the anode 130 of the vacuum tube 100 is connected to a load resistor 134 which in turn is connected to a polarizing potential 132 of, for example +150 volts. Across the resistor 134 is placed a storage condenser 136. Current pulses through the load resistor 134 tends to reduce the potential across the terminals of the storage condenser 136 as a result of the voltage drop effect across resistor 134 caused by the average current value of the unidirectional pulses.

The voltage then appearing across storage condenser 136 being positive with respect to ground therefore varies inversely with the intensity of the signal received during the application of the keying pulses 94 and provides a convenient source for deriving a suitable negative potential for application to the R. F. and I. F. amplifiers of block 10.

This development of a negative control potential from a positive control potential is accomplished by means of gas tubes 140 and 142 connected in series with resistor 150 to a source of negative potential 152 and D. C. amplifier 154. Since the voltage drop across the series connection of gas tubes 140 and 142 remains constant as long as the tubes remain ionized (this action being well known to the art), the potential applied to the grid 156 of D. C. amplifier vacuum tube 154 will be directly proportional to the voltage across the storage condenser 136, although being negative with respect to ground due to the negative 100 volt potential of the supply terminal 152. If then the cathode 158 of the vacuum tube 156 is connected as shown (at 160) to a source of approximately 50 volts negative potential, at the anode 162 thereof, connected through load resistance 164 to ground, there may then be developed across the load resistor 164 a negative control potential of a few volts suitable for AGC control of the amplifiers indicated in block 10.

The AGC action so obtained is readily discernible through consideration of the various circuit responses under the conditions of a reduction in signal strength as applied to the grid 52 of the kinescope 54. In such a case the video signal 101 as applied to the AGC triode 100 would be reduced in amplitude and consequently effect an increase in the amplitude of the current pulses 122 appearing in the plate circuit of the triode. Consequently the voltage across storage capacitor 136 would decrease and thereby cause the negative voltage with respect to ground existing on grid 156 to become more negative. This increase in the negative bias on D. C. amplifier 154 will then cause its output voltage appearing across resistor 164 to become more positive and thereby apply less bias through AGC bus 166 to the R. F. and I. F. amplifiers included in block 10. This decrease in bias causing an increase in amplifier gain consequently corrects for the decrease in signal strength. The condenser 168 in series with resistor 170, said series combination being connected across storage capacitor 136, serves as a damping network to prevent the AGC circuit from establishing sustained oscillation or motorboating.

A similar arrangement is shown in Figure 2 where, however, the gas tubes 140 at 142 have been eliminated and replaced by a diode rectifying circuit associated with diode 180. Referring to Figure 1 again, the current pulses 122 shown at the output of the AGC triode 100 would, in the absence of low A. C. impedance across load resistor 134 (as presented by storage capacitor 136 and damping network 168) produce a series of negative going pulses such as the voltage curve 182 in Figure 2. Since in Figure 2 the anode 130 of the vacuum tube 100 receives its polarizing potential through a load resistance 184 there will appear at the anode 130 a series of potential pulses 182 extending in the negative direction as a result of the combined keying pulse and video signal action provided by the AGC triode 100. As in Figure 1, reduction of signal strength will increase the magnitude of current pulses in the plate circuit of the triode 100 and consequently increase the amplitude of the negative pulses there produced. These negatively extending pulses are coupled by means of capacitor 185 to the cathode 186 of diode 180. Since the anode 188 of diode 180 is connected through a series load comprising resistors 190 and 192, an increase of the amplitude of the pulses 182 will cause a more negative voltage to be developed across storage condenser 194 and hence increase the negative bias on the grid of the D. C. amplifier tube 196. Since the cathode of the triode 196 is connected with a–100 volts at terminal 193, this increase in grid bias due to a reduction in signal strength will cause the negative AGC potential appearing across resistor 198 to become more positive and hence produce the required change in television receiver gain. As before the series connection of a condenser and resistor of suitable value form a damping network 200 which is placed in shunt with the storage condenser 194 to discourage oscillation of the AGC circuit.

Examination of the embodiment shown in Figure 3 reveals a pulse detection and storage circuit identical to that shown in Figure 2, the only difference in the embodiment of Figure 3 being that the keying pulses 94 are applied in shunt with the cathode circuit of vacuum tube 100. Suitable positive potential for the cathode 110 is provided through the cathode resistor 210, which in turn is connected to the tap 122 of potentiometer 120. The keying pulses 94 as developed across the auxiliary secondary 92 are then applied to cathode resistor 210 through the coupling condenser 220, one end of the auxiliary winding 92 being grounded in this embodiment. This latter arrangement shown in Figure 3, is suitable for applications wherein it is desirable to pass no D. C. through the horizontal output transformer auxiliary winding 92. Obviously the method of applying keying pulses to the AGC triode 100 as shown in Figures 1 and 2 is not only more economical and straightforward but manifestly demands less power from the deflection circuit since the keying pulses are not caused to act across a resistive load, as shown for example in Figure 3.

It has hereinbefore been noted that the potentiometer 42 acts in the capacity of a picture "contrast" control which operates to control the white level peaks of the video signal as applied to kinescope but in no way alters the black level of the video signal. This action follows by reason of the manner in which the present AGC system functions to respond to received video signal strength only during the black level portions thereof. It is necessary for the proper operation of the present invention that the direct current level at the video demodulator or second detector DC be preserved up to the grid of the AGC triode 100. Consequently, it may then be assumed that some discrete value of plate current of the video amplifier 24 represents black picture level on the kinescope 54. Therefore, as long as the absolute voltage level of the peaks of the keying pulses 94 (referenced to ground) as well as the DC potential of the cathode 110 (referenced to ground) remains constant, the absolute voltage (referenced to ground) of black level of the received video signal as applied to the kinescope grid 52 will necessarily remain constant. This, of course, presupposes that the input signal to the television receiver is such to render the AGC system operative in a linear portion of its characteristic. Consequently, the potentiometer 120 which alters the potential of the cathode of the AGC triode 100 serves in the capacity of a "black level" control and as such does not in any way effect the white level of the video signal. With the potentiometer 120 set to provide a fixed value of grid bias on the AGC triode 100 and the amplitude of the keying pulses 94 held constant, variation of the "contrast control" potentiometer 42 only provides control over the zero signal plate current of the pentode 24 and in so doing alters only the maximum positive swing of the video signal relative to a fixed black level established by the AGC system.

From the foregoing description, it is seen that the applicant has provided a simple, economical and effective form of television receiver automatic gain control system which utilizes a triode vacuum tube in conjunction with a source of keying pulses derived from the television receiver kinescope electron beam deflection circuit.

What is claimed is:

In a television receiving circuit for receiving and demodulating television signals which have a video component and a synchronizing component, a point of reference potential, an automatic gain control circuit for controlling the gain of the receiving circuit in accordance with a gain control potential, said gain control circuit having an output terminal connected to said receiving circuit so that a positive swing of said output terminal relative to said point of reference potential will increase the gain of said receiving circuit, a signal source having an output terminal adapted to deliver a demodulated television signal having its synchronizing component extending in a negative going direction relative to said point of reference potential, an electromagnetic beam deflection system for said receiver coupled to said signal source output terminal for synchronization by the demodulated synchronizing component of said television signal, said deflection system including an output transformer for coupling said deflection system to a television receiver deflection yoke, a pick up winding on said output transformer, said pick up winding having at least two extremities, one of said extremities being connected to said point of reference potential while the other of said extremities is free, said pick up winding being so polarized that there appears at said free extremity at the end of each deflection cycle a pulse that is negative going relative to said point of reference potential, an electron tube having at least an anode, cathode and control electrode, a connection from said electron tube cathode to the free end of said pick up winding, a connection from said electron tube control electrode to said signal source output terminal, a power supply terminal having a positive potential with respect to said point of reference potential, a resistance connected from said positive power supply terminal to said electron tube anode, a capacitor connected from said electron tube anode to said point of reference potential, a negative power supply terminal having a negative potential with respect to said point of reference potential, a plurality of gaseous discharge tubes connected from said electron tube anode to said negative power supply terminal through a dropping resistor, a direct current amplifier having an input terminal and an output terminal, said amplifier output terminal delivering a signal which is 180 degrees out of phase with a signal applied to said amplifier input terminal, a connection from said dropping resistor to said direct current amplifier input terminal, a connection from said direct current amplifier output terminal to said receiving circuit, and biasing means connected between the cathode and control electrode of said electron tube for rendering said electron tube non-conducting except during the negative going pulses appearing at the free end of said pick up winding.

KARL R. WENDT.

REFERENCES CITED

The following references are of record in the file of this patent:

UNITED STATES PATENTS

| Number | Name | Date |
|---|---|---|
| 2,240,533 | Wilson | May 6, 1941 |
| 2,300,942 | Lewis | Nov. 3, 1942 |
| 2,303,909 | Blumlein | Dec. 1, 1942 |
| 2,307,218 | Hardwick | Jan. 5, 1943 |
| 2,481,045 | Schroeder | Sept. 6, 1949 |

FOREIGN PATENTS

| Number | Country | Date |
|---|---|---|
| 621,465 | Germany | Oct. 17, 1935 |
| 845,897 | France | Sept. 4, 1939 |
| 868,498 | France | Dec. 31, 1941 |
| 873,623 | France | July 15, 1942 |